(12) United States Patent
Ishida (10) Patent No.: US 9,494,448 B2
(45) Date of Patent: Nov. 15, 2016

(54) ELECTRONIC APPARATUS AND DEVICE MANAGEMENT SYSTEM

(71) Applicant: KYOCERA Document Solutions Inc.

(72) Inventor: Takayuki Ishida, Osaka (JP)

(73) Assignee: Kyocera Document Solutions Inc. (JP)

( * ) Notice: Subject to any disclaimer, the term of this patent is extended or adjusted under 35 U.S.C. 154(b) by 38 days.

(21) Appl. No.: 14/658,583

(22) Filed: Mar. 16, 2015

(65) Prior Publication Data

US 2015/0276431 A1 Oct. 1, 2015

(30) Foreign Application Priority Data

Mar. 27, 2014 (JP) ................................. 2014-066955

(51) Int. Cl.
| | |
|---|---|
| G08C 17/00 | (2006.01) |
| G01D 4/00 | (2006.01) |
| G01S 5/00 | (2006.01) |
| G06F 3/12 | (2006.01) |
| H04N 1/00 | (2006.01) |

(52) U.S. Cl.
CPC ............. *G01D 4/002* (2013.01); *G01S 5/0054* (2013.01); *G06F 3/12* (2013.01); *H04N 1/00* (2013.01); *Y02B 90/241* (2013.01); *Y04S 20/32* (2013.01); *Y04S 20/36* (2013.01); *Y04S 20/42* (2013.01)

(58) Field of Classification Search
CPC ...... G01S 5/0054; Y04S 20/32; Y04S 20/36; Y04S 20/42
See application file for complete search history.

(56) References Cited

U.S. PATENT DOCUMENTS

| | | | | |
|---|---|---|---|---|
| 8,880,092 B1* | 11/2014 | Cooley | ................. | H04B 17/27 340/870.02 |
| 2007/0263641 A1* | 11/2007 | Yee | ........................ | G01D 4/002 370/401 |
| 2014/0232553 A1* | 8/2014 | Venkatraman | ........... | H04Q 9/00 340/870.07 |

FOREIGN PATENT DOCUMENTS

JP 2009-288916 12/2009

\* cited by examiner

*Primary Examiner* — Andrew Bee (57) ABSTRACT

A smart meter ID acquiring unit in an electronic apparatus acquires a smart meter ID from a smart meter when the electronic apparatus starts. A registered location information acquiring unit acquires registered location information from an external server if the smart meter ID acquired at this time is different from the smart meter ID acquired at a previous time. A relocation determining unit (a1) determines that the electronic apparatus has been relocated if the registered location information acquired at this time is different from the registered location information acquired at a previous time and (a2) determines that the electronic apparatus has not been relocated if the registered location information acquired at this time is equal to the registered location information acquired at the previous time.

5 Claims, 6 Drawing Sheets

ELECTRONIC APPARATUS AND DEVICE MANAGEMENT SYSTEM

CROSS-REFERENCE TO RELATED APPLICATIONS

This application relates to and claims priority rights from Japanese Patent Applications No. 2014-066955, filed on Mar. 27, 2014, the entire disclosures of which are hereby incorporated by reference herein.

BACKGROUND

1. Field of the Present Disclosure

The present disclosure relates to an electronic apparatus and a device management system.

2. Description of the Related Art

From the view of maintenance management and resource management, a proposed system is capable of remotely determining a location of a device such as a home electrical appliance or an OA (Office Automation) apparatus. In a location detection system, a terminal measures its location using GPS (Global Positioning System), and transmits the measurement result to a monitoring center.

However, in a system using GPS, a cellar phone network or the like, when a device is located in an indoor place where its electric wave does not reach, a location of the device is hardly detected, and consequently, even if an OA apparatus, for example, installed in accordance with a lease contract was relocated improperly, such improper relocation of the device is hardly detected.

SUMMARY

An electronic apparatus according to an aspect of the present disclosure includes a communication device, a smart meter ID acquiring unit, a registered location information acquiring unit, and a relocation determining unit. The communication device is capable of communicating with a smart meter. The smart meter ID acquiring unit is configured to acquire a smart meter ID of the smart meter with which the communication device can communicate using the communication device when the electronic apparatus starts. The registered location information acquiring unit is configured to acquire registered location information from an external server if the smart meter ID acquired at this time by the smart meter ID acquiring unit is different from the smart meter ID acquired at a previous time by the smart meter ID acquiring unit, the registered location information indicating a location registered in an electric power distribution company for the smart meter that has the smart meter ID acquired at this time. The relocation determining unit is configured to (a1) determine that the electronic apparatus has been relocated if the registered location information acquired at this time by the registered location information acquiring unit is different from the registered location information acquired at a previous time by the registered location information acquiring unit and (a2) determine that the electronic apparatus has not been relocated if the registered location information acquired at this time by the registered location information acquiring unit is equal to the registered location information acquired at the previous time by the registered location information acquiring unit.

A device management system according to an aspect of the present disclosure includes plural electronic apparatuses, plural smart meters, plural information concentrating devices, and a device management server. The plural electronic apparatuses operate in plural districts. The plural smart meters are configured to communicate with the plural electronic apparatuses in plural user buildings respectively. The plural information concentrating devices of an electric power distribution company are configured to collect data from the smart meters in each one of the plural districts and identify the number of the electronic apparatuses in operation in each one of the plural districts. The device management server is configured to detect incoming and/or outgoing of an electronic apparatus in the plural districts on the basis of the identified number of the electronic apparatuses in operation in each one of the plural districts.

These and other objects, features and advantages of the present disclosure will become more apparent upon reading of the following detailed description along with the accompanied drawings.

DETAILED DESCRIPTION

Hereinafter, embodiments according to aspects of the present disclosure will be explained with reference to drawings.

Embodiment 1

Figure 1:
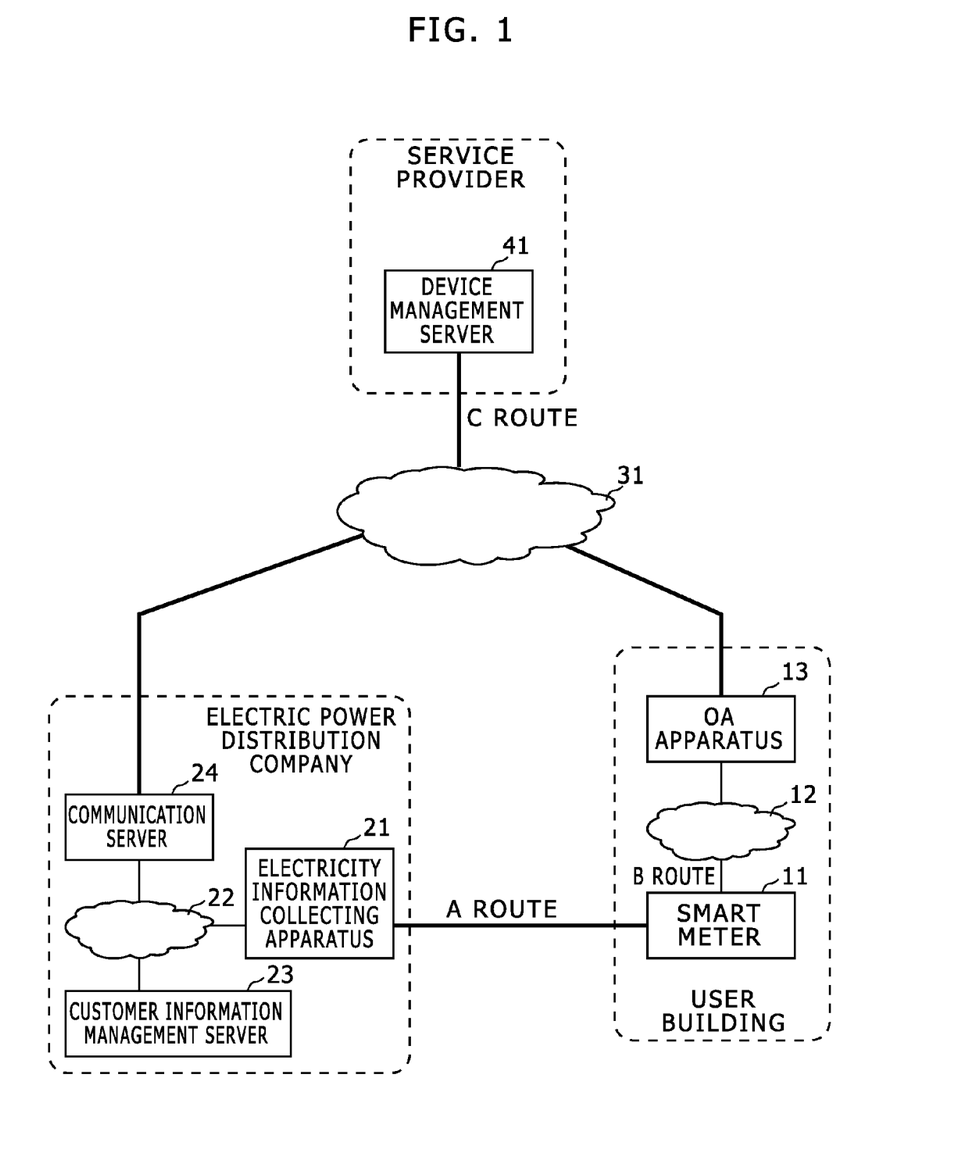
FIG. 1 shows a block diagram that indicates a configuration of a system including an OA apparatus as an electronic apparatus according to Embodiment 1 of the present disclosure.

FIG. 1 shows a block diagram that indicates a configuration of a system including an OA apparatus as an electronic apparatus according to Embodiment 1 of the present disclosure.

In the system shown in FIG. 1, a smart meter 11 is a watt-hour meter installed in a user building and capable of communicating with an electricity information collecting apparatus 21 of an electric power distribution company through a predetermined communication network. This communication network is classified into A route in a smart grid, and for example, includes PLC (Power Line Communication) through a cable of an electric power transmission and distribution network or wireless communication facilities (e.g. multi-hop communication of 950 MHz band) installed with an electric power transmission and distribution network.

The smart meter 11 measures electrical energy consumption in a user building and transmits information on electrical energy consumption to a remote electric power distribution company using an automatic metering function, and performs remote connection or remote disconnection in accordance with a command received from the remote electric power distribution company when concluding or canceling an electricity supply contract. Further, the smart meter 11 is connected to a LAN (Local Area Network) 12 in the user building and performs controlling, monitoring and the like of a home electrical appliance and the OA apparatus 13 connected to the LAN 12. This LAN 12 is classified into B route in a smart grid, and for example, includes PLC through an indoor electric power distribution network in the user building, wireless facilities (e.g. IEEE 802.15.4, Zig-Bee, or 920 MHz band) or the like.

The OA apparatus 13 is a device that has a network communication function and capable of communicating with the smart meter 11 for controlling, monitoring or the like by the smart meter 11.

An electricity information collecting apparatus 21 is installed in a site of the electric power distribution company and collects data from the smart meters 11 installed in the user buildings of plural contractors.

Further, in the site of the electric power distribution company, the electricity information collecting apparatus 21 is connected to a LAN 22, and a customer information management server 23 is connected to the LAN 22.

The customer information management server 23 executes a server program using a built-in computer and, in accordance with the server program, manages at least a smart meter ID (i.e. identification unique to each smart meter) and address information of an electricity consumption place so as to be related to each other in a database as customer information on a contractor for whom a smart meter is installed to the contractor's consumption place. It should be noted that if the consumption place is in an apartment or a commercial building, then the address information of the consumption place includes its floor number, its room number or the like.

Further, a communication server 24 is connected to the LAN 22, acts as a front-end server of the electric power distribution company side, and performs communication with a service provider through a WAN (Wide Area Network) 31 such as Internet. This WAN 31 is classified into C route in a smart grid. Further, the OA apparatus 13 or the smart meter 11 in the user building is connected to the WAN 31 (here, the OA apparatus 13 is connected to the WAN 31).

In a site of the service provider, a device management server 41 is installed and manages a device to be managed (here, the OA apparatus 13) so as to relate the device to its device ID (identification unique to each device). Here, for example, the service provider may be a vendor of the OA apparatus 13 or a company providing a service to identify a location of the OA apparatus 13 of the vendor.

In Embodiment 1, the OA apparatus 13 is an image forming apparatus such as a multi function peripheral.

Figure 2:
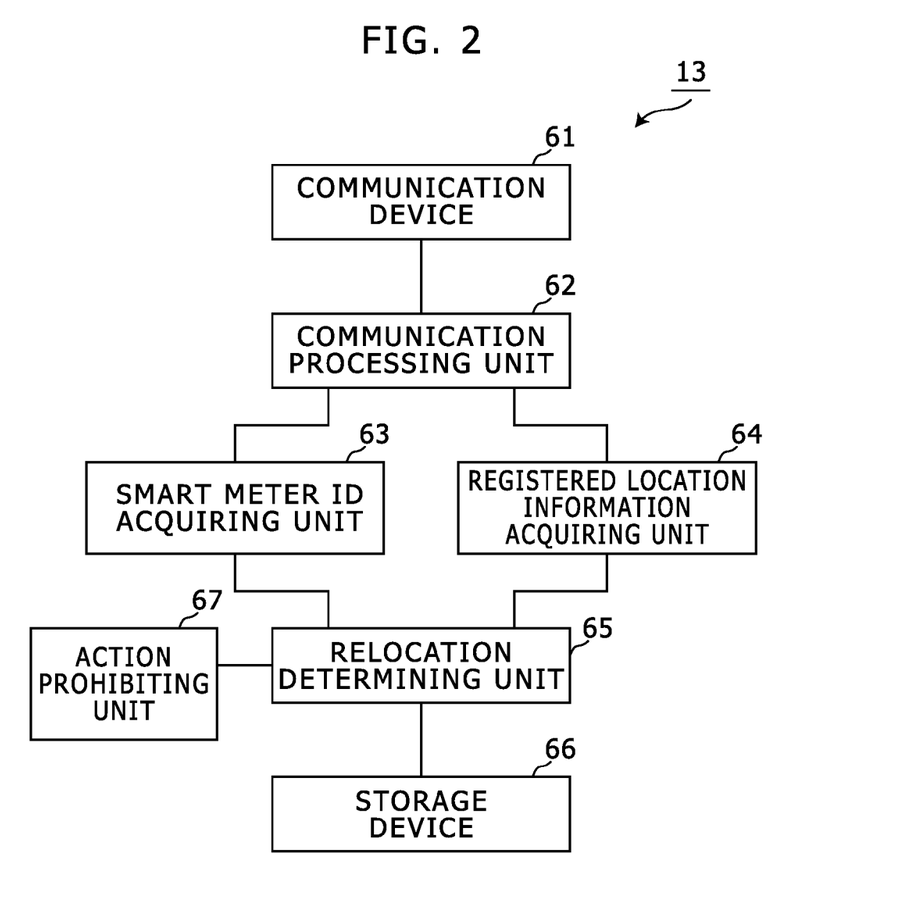
FIG. 2 shows a block diagram that indicates an example of a configuration of the OA apparatus 13 in the FIG. 1.

FIG. 2 shows a block diagram that indicates an example of a configuration of the OA apparatus 13 in the FIG. 1. The OA apparatus 13 includes a communication device 61, a communication processing unit 62, a smart meter ID acquiring unit 63, a registered location information acquiring unit 64, a relocation determining unit 65, a storage device 66, and an action prohibiting unit 67.

The communication device 61 is a device such as a network interface capable of communicating through the LAN 12 and the WAN 31. For example, the communication processing unit 62, the smart meter ID acquiring unit 63, the registered location information acquiring unit 64, the relocation determining unit 65, the storage device 66, and the action prohibiting unit 67 are embodied by executing a program with a computer in the OA apparatus 13.

The communication device 61 is enabled to communicate with a smart meter 11 when the communication device 61 is connected to the LAN 12.

The communication processing unit 62 performs data communication with the smart meter 11 in accordance with a predetermined protocol and data communication with the device management server 41 in accordance with a predetermined protocol by controlling the communication device 61.

The smart meter ID acquiring unit 63 acquires a smart meter ID of the smart meter 11 from the smart meter 11 with which the communication device 61 can communicate using the communication device 61 and the communication processing unit 62 when this OA apparatus 13 starts.

The registered location information acquiring unit 64 acquires registered location information from the device management server 41 if the smart meter ID acquired at this time by the smart meter ID acquiring unit 63 is different from the smart meter ID acquired at a previous time by the smart meter ID acquiring unit 63. The registered location information indicates a location registered in an electric power distribution company for the smart meter that has the smart meter ID acquired at this time.

If the smart meter ID acquired at this time by the smart meter ID acquiring unit 63 is equal to the smart meter ID acquired at the previous time by the smart meter ID acquiring unit 63, then the registered location information acquiring unit 64 does not acquire registered location information.

If the registered location information acquired at this time by the registered location information acquiring unit 64 is different from the registered location information acquired at a previous time by the registered location information acquiring unit 64, then the relocation determining unit 65 determines that this OA apparatus 13 has been relocated. If the registered location information acquired at this time by the registered location information acquiring unit 64 is equal to the registered location information acquired at the previous time by the registered location information acquiring unit 64, then the relocation determining unit 65 determines that this OA apparatus 13 has not been relocated.

Further, in Embodiment 1, if the registered location information acquiring unit 64 fails to acquire the registered location information from the device management server 41 in a case that the smart meter ID and the registered location information are stored in the storage device 66, then the relocation determining unit 65 determines that this OA apparatus 13 has been relocated. In a case that the smart meter ID and the registered location information are not stored in the storage device 66, even if the registered location information acquiring unit 64 fails to acquire the registered location information from the device management server 41, then the relocation determining unit 65 does not determine that this OA apparatus 13 has been relocated.

The storage device 66 is a non volatile storage device such as a flash memory.

In Embodiment 1, if the smart meter ID and the registered location information are not stored in the storage device 66, then the smart meter ID acquired at this time and the registered location information acquired at this time are stored in the storage device 66.

In Embodiment 1, in a case that the smart meter ID and the registered location information are not stored in the storage device 66, (a) the registered location information acquiring unit 64 acquires the registered location information from the device management server 41 if the smart meter ID acquired at this time is different from the smart meter ID acquired at the previous time, and (b) the relocation determining unit 65 determines that this OA apparatus 13 has been relocated if the registered location information acquired at this time is different from the registered location information stored in the storage device 66 and determines that this OA apparatus 13 has not been relocated if the registered location information acquired at this time is equal to the registered location information stored in the storage device 66.

Further, in a case that the smart meter ID and the registered location information are stored in the storage device 66, if the smart meter ID acquired at this time is different from the smart meter ID stored in the storage device 66 but the registered location information acquired at this time is equal to the registered location information stored in the storage device 66, then the smart meter ID stored in the storage device 66 is updated with the smart meter ID acquired at this time.

The action prohibiting unit 67 prohibits an action for a predetermined function of this OA apparatus 13 when the relocation determining unit 65 determines that this OA apparatus 13 has been relocated. For example, if the OA apparatus 13 is a multi function peripheral, an action for a printing function is prohibited.

Figure 3:
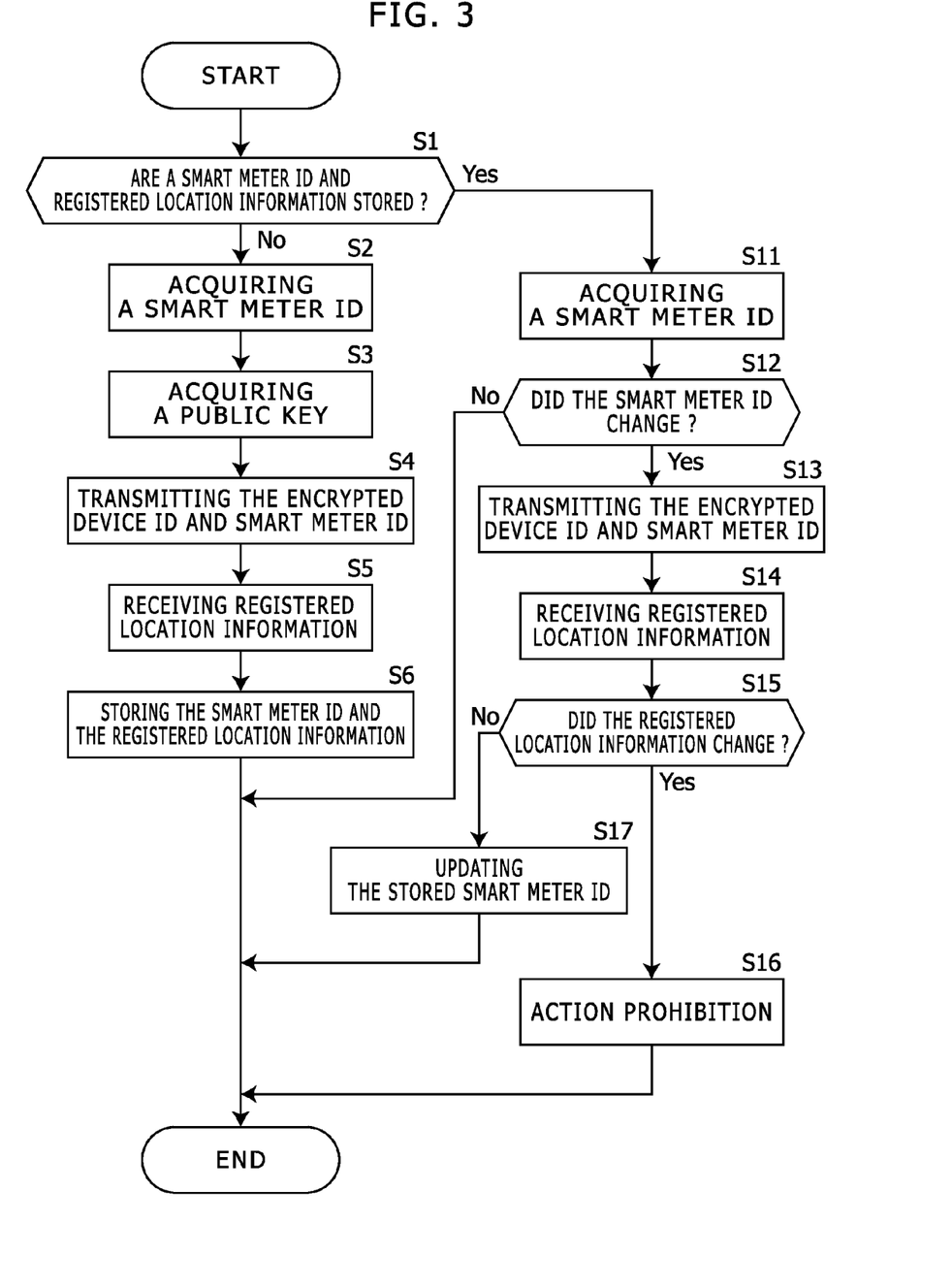
FIG. 3 shows a flowchart that explains a starting behavior of the OA apparatus 13 shown in the FIG. 2.

The following part explains a behavior of the OA apparatus 13 in Embodiment 1. FIG. 3 shows a flowchart that explains a starting behavior of the OA apparatus 13 shown in the FIG. 2.

When the OA apparatus 13 starts, the relocation determining unit 65 determines whether a smart meter ID and registered location information are stored in the storage device 66 or not (in Step S1).

If it is determined that no smart meter IDs and no registered location information are stored in the storage device 66, then the smart meter ID acquiring unit 63 acquires a smart meter ID of the smart meter 11 with which the communication device 61 can communicate using the communication device 61 and the communication processing unit 62 (in Step S2).

Further, the registered location information acquiring unit 64 acquires a public key from the device management server 41 using the communication device 61 and the communication processing unit 62 (in Step S3), encrypts the acquired smart meter ID and a device ID of this OA apparatus 13 with the public key, and transmits the encrypted smart meter ID and device ID to the device management server 41 using the communication device 61 and the communication processing unit 62 (in Step S4).

Furthermore, the registered location information acquiring unit 64 receives registered location information of this OA apparatus 13 from the device management server 41 using the communication device 61 and the communication processing unit 62 (in Step S5).

In this situation, the device management server 41 receives the encrypted smart meter ID and device ID, decrypts the encrypted smart meter ID and device ID with a private key corresponding to the aforementioned public key, acquires address information corresponding to this smart meter ID from the customer information management server 23 through the communication server 24 of the electric power distribution company side, and transmits the acquired address information as the registered location information to this OA apparatus 13.

Subsequently, the relocation determining unit 65 stores the smart meter ID acquired in Step S2 and the registered location information received in Step S5 to the storage device 66 (in Step S6).

As mentioned, if no smart meter IDs and no registered location information are stored in the storage device 66, the smart meter ID and the registered location information are stored in the storage device 66. Therefore, when this OA apparatus 13 is installed in its proper location and firstly starts, the smart meter ID and the registered location information of the smart meter 11 installed in this location are stored in the storage device 66.

Contrarily, if a smart meter ID and registered location information are stored in the storage device 66, then the smart meter ID acquiring unit 63 acquires a smart meter ID of the smart meter 11 with which the communication device 61 can communicate using the communication device 61 and the communication processing unit 62 (in Step S11).

Subsequently, the relocation determining unit 65 determines whether the smart meter ID acquired at this time is different from the smart meter ID stored in the storage device 66 or not (in Step S12).

If it is determined that the smart meter ID acquired at this time is different from the smart meter ID stored in the storage device 66, then the registered location information acquiring unit 64 encrypts the smart meter ID acquired at this time and the device ID of this OA apparatus 13 with the aforementioned public key, and transmits the encrypted smart meter ID and device ID to the device management server 41 using the communication device 61 and the communication processing unit 62 (in Step S13). Afterward, the registered location information acquiring unit 64 receives the registered location information of this OA apparatus 13 from the device management server 41 using the communication device 61 and the communication processing unit 62 (in Step S14).

Subsequently, the relocation determining unit 65 determines whether the registered location information acquired at this time is different from the registered location information stored in the storage device 66 or not (in Step S15).

If it is determined that the registered location information acquired at this time is different from the registered location information stored in the storage device 66, then the relocation determining unit 65 determines that this OA apparatus 13 has been relocated and the action prohibiting unit 67 prohibits an action for a predetermined function of this OA apparatus 13 (in Step S16).

Contrarily, if it is determined that the registered location information acquired at this time is equal to the registered location information stored in the storage device 66, then the relocation determining unit 65 determines that this OA apparatus 13 has not been relocated and updates the smart meter ID stored in the storage device 66 with the smart meter ID acquired at this time (in Step S17).

If in Step S12 it is determined that the smart meter ID acquired at this time is equal to the smart meter ID stored in the storage device 66, then the acquisition of the registered location information (Steps S13 and S14), the action prohibition (Step S16), and the update of the smart meter ID (Step S17) are not performed.

In the aforementioned Embodiment 1, when the OA apparatus 13 starts, using the communication device 61, the smart meter ID acquiring unit 63 acquires a smart meter ID of the smart meter 11 with which the communication device 61 can communicate. If the smart meter ID acquired at this time is different from the smart meter ID acquired at a previous time, the registered location information acquiring unit 64 acquires registered location information from the device management server 41. The registered location information indicates a location registered in the electric power distribution company for the smart meter that has the smart meter ID acquired at this time. If the registered location information acquired at this time is different from the registered location information acquired at a previous time, the relocation determining unit 65 determines that this OA apparatus 13 has been relocated.

Therefore, it is possible to detect improper relocation of the OA apparatus 13. For example, it is possible to detect improper relocation of the OA apparatus installed by the service provider on the basis of a lease contract.

Embodiment 2

Figure 4:
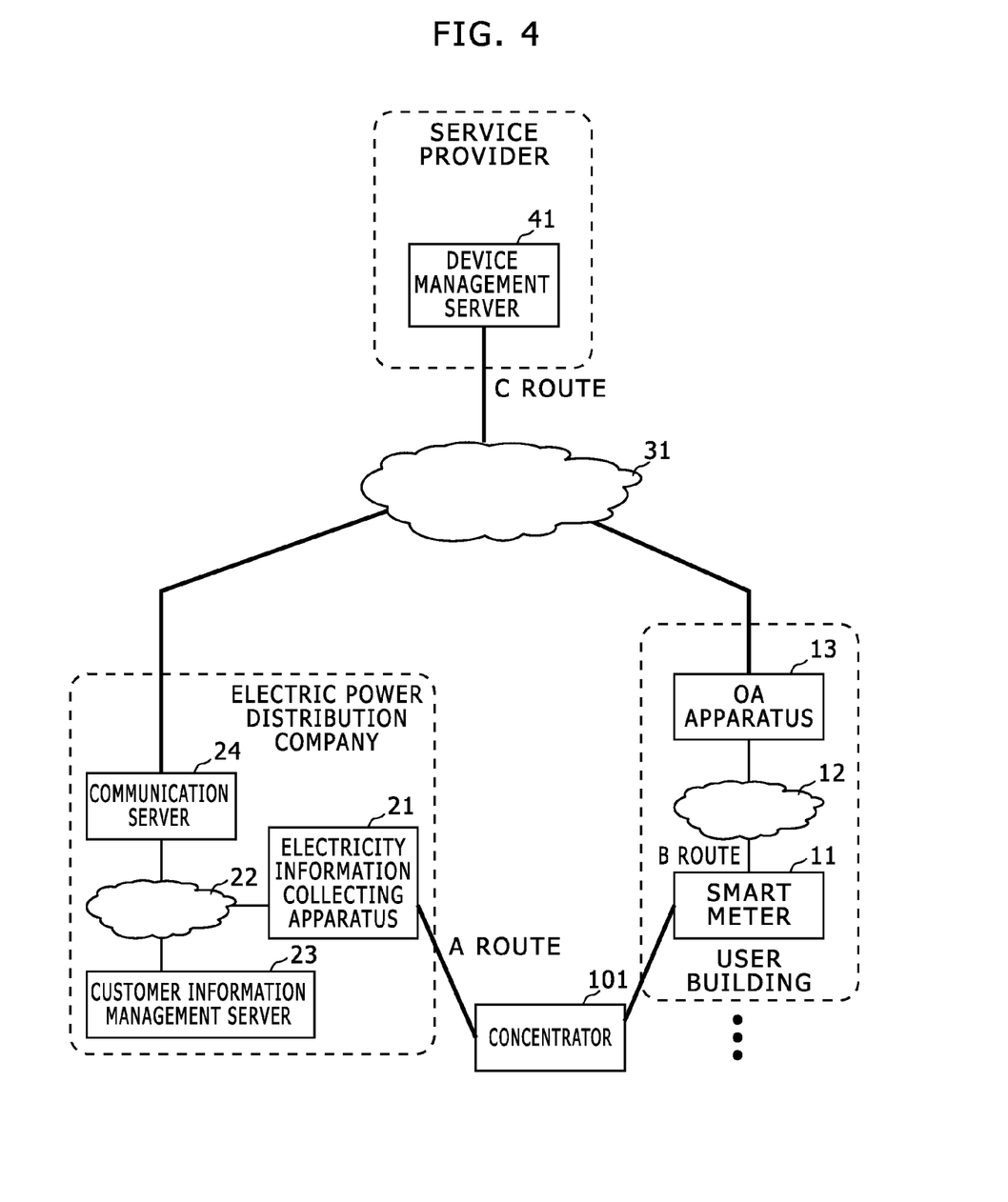
FIG. 4 shows a block diagram that indicates a configuration of a device management system according to Embodiment 2 of the present disclosure.

FIG. 4 shows a block diagram that indicates a configuration of a device management system according to Embodiment 2 of the present disclosure.

In the system shown in FIG. 4, plural OA apparatus 13 operate in plural districts. Further, plural smart meters 11 are installed to communicate with plural OA apparatuses 13 in user buildings, respectively. Each one of the plural OA apparatuses 13 stores an identification code assigned to the service provider. This identification code is common (i.e. single) to plural devices such as the OA apparatuses 13. Each one of the plural OA apparatuses 13 transmits the identification code to the smart meter 11 at regular intervals.

Figure 5:
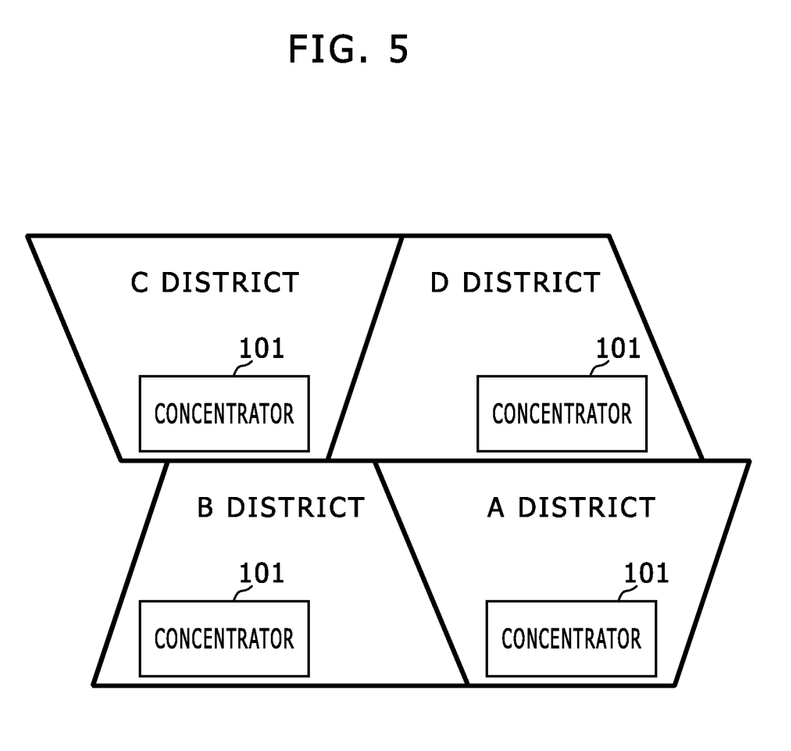
FIG. 5 shows a diagram that indicates an example of plural districts for which the number of devices are monitored in the system shown in FIG. 4.

Plural concentrators 101 are installed in plural districts, respectively, and each one of the concentrators 101 performs data collection from the smart meters 11 installed in its district using multi-hop wireless communication or the like. FIG. 5 shows a diagram that indicates an example of plural districts for which the number of devices are monitored in the system shown in FIG. 4. In the example shown in FIG. 5, the concentrators 101 are installed in A district to D district, respectively.

Each one of the smart meters 11 receives the identification code, and at regular intervals collectively transmits the received one or more identification codes to the concentrator 101 corresponding to the district in which this smart meter 11 is located.

Each one of the concentrators 101 transmits, as device information of its district, the number of the OA apparatuses 13 that transmitted the identification code to the smart meter 11 (i.e. the number of the OA apparatuses in operation) in its district to the electricity information collecting apparatus 21.

The electricity information collecting apparatus 21 receives the respective numbers of the OA apparatuses 13 in operation in the plural districts from the concentrators 101 of the plural districts, and transmits the numbers of the OA apparatuses 13 in operation to the device management server using the communication server 24 as a response to a request from the device management server 41 of the service provider. This transmitted numbers of the OA apparatuses 13 are the numbers of the OA apparatuses 13 in operation that have the identification code of the requesting service provider.

The device management server 41 receives the numbers of the OA apparatuses 13 in operation identified by the plural concentrators 101 in the plural districts, and detects incoming and/or outgoing of the OA apparatus 13 in the plural districts on the basis of the received numbers of the OA apparatuses 13 in operation.

Specifically, the device management server 41 detects incoming and/or outgoing of the OA apparatus 13 in the plural districts on the basis of (a) the numbers of the OA apparatuses 13 in operation identified by the concentrators 101 in the plural districts and (b) the numbers of the OA apparatuses 13 of which registered locations are included in the plural districts (for example, in each district, the number of the OA apparatuses 13 of which locations specified by lease contracts or the like are included in this district).

Figure 6:
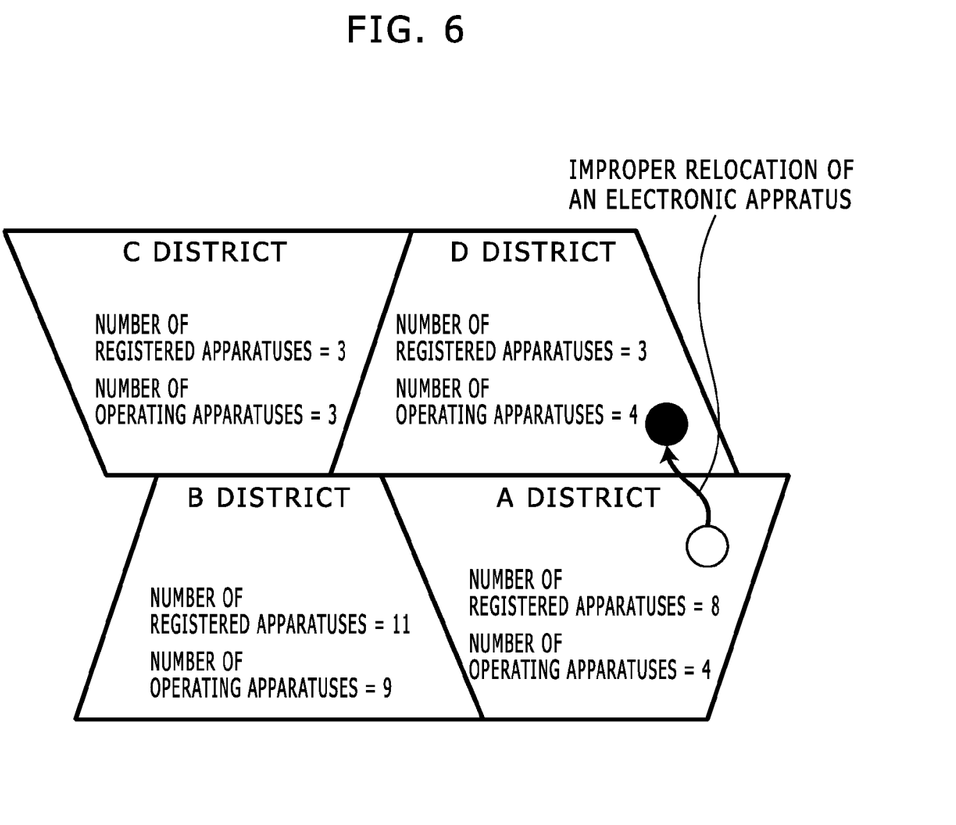
FIG. 6 shows a diagram that explains detection of improper relocation of a device in the plural districts shown in FIG. 5.

FIG. 6 shows a diagram that explains detection of improper relocation of a device in the plural districts shown in FIG. 5. If the number of the OA apparatuses 13 in operation in a district such as D district shown in FIG. 6 among the plural districts is larger than the number of the OA apparatuses 13 of which registered locations are included in this district, then the device management server 41 determines the incoming of the OA apparatus 13 and informs this district as a warning district to the service provider.

Further, at a predetermined timing in a weekday (i.e. at the time when it is supposed that the OA apparatuses 13 are in operation within standard business hours, e.g. 11 AM), if the number of the electronic apparatuses in operation in a district such as A district shown in FIG. 6 among the plural districts is less than a predetermined ratio (e.g. 70 percent) multiplied by the number of the OA apparatuses of which registered locations are included in this district, then the device management server 41 determines the outgoing of the OA apparatus 13 and informs this district as a caution district to the service provider.

Other configuration and behavior of each element in the system of Embodiment 2 are the same as those in Embodiment 1 and therefore are not explained here.

In the aforementioned Embodiment 2, each one of the plural concentrators 101 collects data from the smart meters 11 in each one of the plural districts and identifies the number of the OA apparatuses 13 in operation in each one of the plural districts. The device management server 41 detects incoming and/or outgoing of the OA apparatus 13 in the plural districts on the basis of the identified number of the OA apparatuses 13 in operation in each one of the plural districts.

Therefore, it is possible to detect improper relocation of the OA apparatus 13.

The description has been presented for purposes of illustration and description, and is not intended to be exhaustive or limited.

For example, in Embodiment 1, the OA apparatus 13 acquires the registered location information from the service provider. Alternatively, the OA apparatus 13 may directly acquire the registered location information from the communication server 24 of the electric power distribution company.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic apparatus, comprising:
   a communication device capable of communicating with a smart meter;
   a smart meter ID acquiring unit configured to acquire a smart meter ID of the smart meter with which the communication device can communicate using the communication device when the electronic apparatus starts;
   a registered location information acquiring unit configured to acquire registered location information from an external server if the smart meter ID acquired at this time by the smart meter ID acquiring unit is different from a smart meter ID acquired at a previous time by the smart meter ID acquiring unit, the registered location information indicating a location registered in an electric power distribution company for the smart meter that has the smart meter ID acquired at this time;

a relocation determining unit configured to (a1) determine that the electronic apparatus has been relocated if the registered location information acquired at this time by the registered location information acquiring unit is different from a registered location information acquired at a previous time by the registered location information acquiring unit and (a2) determine that the electronic apparatus has not been relocated if the registered location information acquired at this time by the registered location information acquiring unit is equal to the registered location information acquired at the previous time by the registered location information acquiring unit.

2. The electronic apparatus according to claim 1, further comprising a non volatile storage device;

wherein (b1) if the smart meter ID acquired at a previous time and the registered location information acquired at a previous time are not stored in the storage device, then the smart meter ID acquired at this time and the registered location information acquired at this time are stored in the storage device, and (b2) if the smart meter ID acquired at a previous time and the registered location information acquired at a previous time are stored in the storage device, then the registered location information acquiring unit acquires the registered location information from the external server if the smart meter ID acquired at this time is different from the smart meter ID acquired at the previous time, and the relocation determining unit (c1) determines that the electronic apparatus has been relocated if the registered location information acquired at this time is different from the registered location information stored in the storage device and (c2) determines that the electronic apparatus has not been relocated if the registered location information acquired at this time is equal to the registered location information stored in the storage device.

3. The electronic apparatus according to claim 2, wherein in a case that the smart meter ID acquired at a previous time and the registered location information acquired at a previous time are stored in the storage device, if the smart meter ID acquired at this time is different from the smart meter ID stored in the storage device but the registered location information acquired at this time is equal to the registered location information stored in the storage device, then the smart meter ID stored in the storage device is updated with the smart meter ID acquired at this time.

4. The electronic apparatus according to claim 1, further comprising an action prohibiting unit configured to prohibit an action for a predetermined function of the electronic apparatus when the relocation determining unit determines that the electronic apparatus has been relocated.

5. The electronic apparatus according to claim 1, wherein the relocation determining unit is further configured to determine that the electronic apparatus has been relocated if the registered location information acquiring unit fails to acquire the registered location information from the external server in a case that the smart meter ID acquired at a previous time and the registered location information acquired at a previous time are stored in a storage device.

* * * * *